United States Patent
Wild (10) Patent No.: US 9,239,433 B2
(45) Date of Patent: Jan. 19, 2016

(54) OPTICAL FIBER CABLE CONNECTION DEVICE AND METHOD

(71) Applicant: John Mezzalingua Associates, LLC, Liverpool, NY (US)

(72) Inventor: Werner Wild, Buttenwiessen (DE)

(73) Assignee: John Mezzalingua Associates, LLC, Liverpool, NY (US)

( * ) Notice: Subject to any disclaimer, the term of this patent is extended or adjusted under 35 U.S.C. 154(b) by 0 days.

(21) Appl. No.: 14/208,445

(22) Filed: Mar. 13, 2014

(65) Prior Publication Data

US 2014/0270647 A1 Sep. 18, 2014

Related U.S. Application Data

(60) Provisional application No. 61/794,123, filed on Mar. 15, 2013.

(51) Int. Cl.
*G02B 6/38* (2006.01)
*G02B 6/32* (2006.01)

(52) U.S. Cl.
CPC ............... *G02B 6/32* (2013.01); *G02B 6/3839* (2013.01); *G02B 6/3829* (2013.01); *G02B 6/3894* (2013.01)

(58) Field of Classification Search
CPC ............................ G02B 6/3839; G02B 6/3817
See application file for complete search history.

(56) References Cited

U.S. PATENT DOCUMENTS

| | | | |
|---|---|---|---|
| 4,842,355 A * | 6/1989 | Gold et al. | ...................... 385/26 |
| 5,283,853 A | 2/1994 | Szegda | |
| 5,315,684 A | 5/1994 | Szegda | |
| 5,371,819 A | 12/1994 | Szegda | |
| 5,371,821 A | 12/1994 | Szegda | |
| 5,371,827 A | 12/1994 | Szegda | |
| 5,444,810 A | 8/1995 | Szegda | |
| 5,588,077 A * | 12/1996 | Woodside | ........................ 385/26 |
| 5,692,090 A | 11/1997 | Szegda | |
| 7,374,424 B1 * | 5/2008 | Nurmi et al. | .................... 439/31 |
| D574,775 S | 8/2008 | Amidon | |
| 2010/0178806 A1 | 7/2010 | Montena | |
| 2011/0199490 A1 | 8/2011 | Shafer et al. | |
| 2012/0201498 A1 | 8/2012 | Montena | |

FOREIGN PATENT DOCUMENTS

| | | |
|---|---|---|
| EP | 0518597 A2 | 12/1992 |
| EP | 0518597 A3 | 4/1993 |
| EP | 0555579 A1 | 8/1993 |
| WO | 2011120028 A2 | 9/2011 |

* cited by examiner

*Primary Examiner* — Omar R Rojas
(74) *Attorney, Agent, or Firm* — Barclay Damon, LLP (57) ABSTRACT

An optical fiber connector has, in one embodiment, a body and a light management device. The light management device is operable to manage a plurality of light beams for exchange between a plurality of sets of optical fibers.

15 Claims, 7 Drawing Sheets

OPTICAL FIBER CABLE CONNECTION DEVICE AND METHOD

PRIORITY CLAIM

This application is a non-provisional of, and claims the benefit and priority of, U.S. Provisional Patent Application No. 61/794,123, filed on Mar. 15, 2013. The entire contents of such application are hereby incorporated by reference.

BACKGROUND

Optical fiber cables contain one or more optical fiber channels and transport data in the form of light signals. Fiber optical cable connectors are available in a variety of types depending on the fiber optic cables being connected. Existing multi-channel fiber connectors require a form of keying, whereby a first channel in a first connector must closely align with a first channel in a second connector to transmit data. Likewise, a second channel in the first connector must closely align with the second channel in the second connector. This often leads to difficulties for a user attempting to connect two fiber optic cables inasmuch as the filaments must be accurately aligned and can result in a failed connection. Additionally, these fiber optic connectors are highly complex and costly to fabricate.

Accordingly, there is a need to overcome, or otherwise lessen the effects of, the disadvantages and shortcomings described above.

SUMMARY

According to one embodiment, an optical fiber connector comprises a body extending along an axis and configured to receive a plurality of optical fibers such that at least two optical fibers each have an end spaced apart from each other and positioned along the axis. The optical fiber connector includes a light management device supported by the body and configured to (i) receive a first light beam from a first one of the ends, (ii) modify the first light beam to produce a first light beam profile, (iii) direct the first light beam so as to be receivable by a first corresponding optical fiber of a second optical fiber cable, (iv) receive a second light beam from a second one of the ends, (v) modify the second light beam to produce a second light beam profile; and (vi) direct the second light beam so as to be receivable by a second corresponding optical fiber of the second optical fiber cable. The light profile of each fiber optic cable is altered so as to allow information to be transmitted/exchanged across the mating interface, i.e., across the first and second joinable ends, without the need to radially index or key an input fiber with an output fiber.

DETAILED DESCRIPTION

Figure 1:
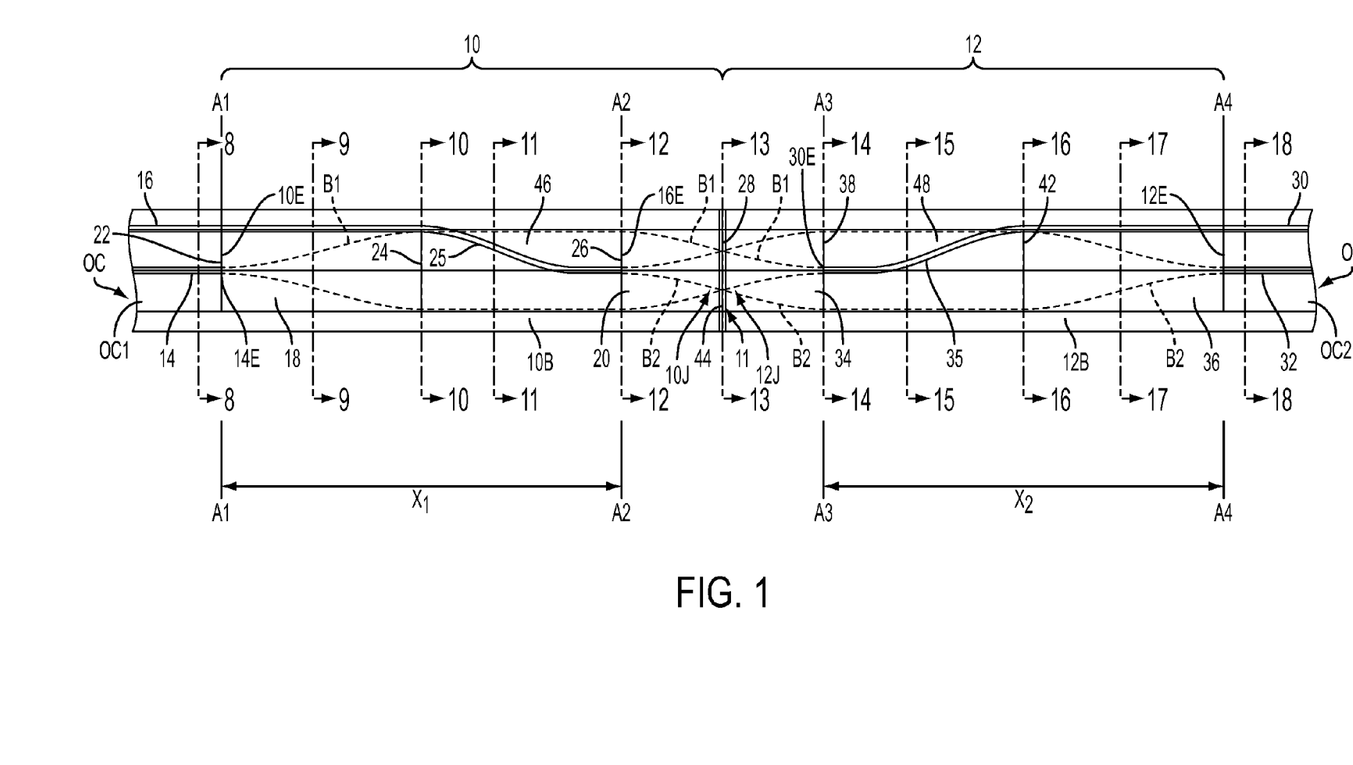
FIG. 1 depicts a schematic view of one embodiment including a mated pair of optical fiber connectors.

Referring to FIG. 1, a schematic view of a first fiber optic connector 10 is depicted for mating along an interface 11 to a second fiber optic connector 12. When mated, the connectors 10 and 12 form a fiber optic cable union device or union assembly 13. More specifically, the first fiber optic connector 10 includes a first joinable end 10J which is detachably coupled along the interface 11 to a second joinable end 12J of the second fiber optic connector 12. Each of the first and second fiber optic connectors 10, 12 is operatively coupled a fiber optic cable OC to transmit data therebetween without physically connecting the optical filaments of one fiber optic cable OC1 to the optical filaments of the other fiber optic cable OC2. The import of this geometric configuration will become apparent in view of the following detailed description.

Each of the fiber optic connectors 10, 12 are essentially identical, hence the first fiber optical cable connector 10 will be described with the understanding that the second fiber optical cable connector 12 is essential identical and a mirror image of the first fiber optical connector 10.

The first fiber optic cable connector 10 includes a body 10B extending along a longitudinal axis LA and includes a first cable receiving end 10E configured to receive at least a part of a first optical cable OC1. The body 10B of the first optic fiber connector 10 is configured to receive first and second optical fibers 14 and 16. The first optical fiber 14 has a first fiber end 14E positioned substantially on the longitudinal axis LA at a first axial position A1. The second optical fiber 16 has a second fiber end 16E positioned substantially on the longitudinal axis A at a second axial position A2. In the described embodiment, the first and second fiber ends 14E, 16E are positioned along the longitudinal axis such that the ends 14E, 16E are axial spaced-apart along the longitudinal axis LA.

It should be appreciated that the first and second optical fibers 14, 16 may also be referred to as filaments, channels, or lines, inasmuch as each transmits data and/or information along a beam of light. The beam of light is carried within a transparent optic core and contained therein by an outer "cladding" which envelopes the peripheral surface of the optic core to reflect light back into the glass filament. The glass filament or core of the optical fibers 14, 16 have optical properties which produce a light profile. In operation, a beam of light is guided along a beam path and produces a light profile at a cross-section of the optical fiber 14, 16. Hence, the beam path refers to the way the light travels along the longitudinal axis LA of the fiber optic connector 10 and the light profile refers to the area affected by the light at any particular cross-section of the optical fiber 14, 16.

While the first fiber optic cable connector 12 is shown to include only two signal carrying fiber optic cables 14, 16, disposed about a longitudinal axes LA, it should be appreciated that a multiplicity of fiber optic cables may be disposed within a housing to transmit optical signals between first and second fiber optic cables.

The optical properties of the optical fibers 14, 16 may allow the light profile to occupy the entire cross-sectional area of the optic filament or some portion thereof. That is, the light profile may be expanded from a point of light at one end to a fully-expanded profile at the other end. Alternatively, the light may be partially expanded such that the light profile may occupy a portion of the cross-sectional area, e.g., ½, ¼ or ⅛th the diameter of the fiber optic filament 14, 16.

In the described embodiment, the light profile of each fiber optic cable 14, 16 is altered by a gradient refractive index lens or "GRIN" lens operative to expand or contract light entering an end of a lens. More specifically, the first fiber optic connector 10 includes a first light management device comprising a first GRIN lens 18 associated with the first optical fiber 14 and a second GRIN lens 20 associated with the second optical fiber 16. The first and second GRIN lens 18, 20 are cylindrical/tubular in shape, coaxially aligned along the longitudinal axis A and are spaced-apart by a distance X1.

Figure 8:
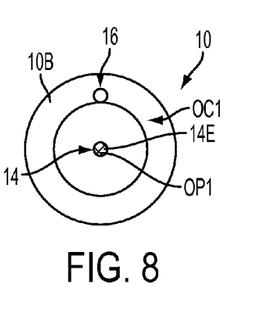
FIG. 8 depicts a sectional view taken substantially along line 8-8 of FIG. 1 wherein a pair of optical fibers transmit light-carrying signals into a first optical fiber connector.

In FIGS. 1 and 8, the first GRIN lens 18 receives a first channel, signal or beam from the first fiber end 14E along a face surface 22 of the GRIN lens 18. The first beam has a characteristic fiber light profile OP1 upon entering the GRIN lens 18 at a first face surface 22 corresponding to the surface area, $\pi D2$, of a conventional fiber optic filament. Additionally, a second channel, signal or beam B2 from the second fiber 16 is initially disposed radially outboard of, and adjacent to, the first GRIN lens 18. To maintain the spatial position of the second optical fiber 16 relative to the first optical fiber 14, the second optical fiber 16 may be bonded to, or molded within, a cylindrical outer ring formed along the outer periphery of the first GRIN lens 18.

Figure 9:
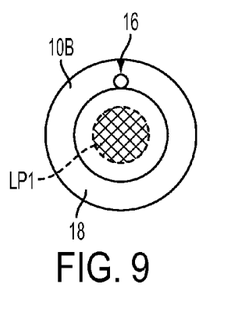
FIG. 9 depicts a sectional view taken substantially along line 9-9 of FIG. 1 wherein the light profile of a first optical fiber is partially expanded within a first GRIN lens and the light profile of a second optical fiber is disposed radially outboard of first GRIN lens.

In FIGS. 1 and 9, the fiber light profile OP1 is modified by the first GRIN lens 18 resulting in a first light beam path B1 (see FIG. 1) through the GRIN lens 18. In the described embodiment, the first light beam path B1 results in a first light profile LP1 which is different from the original fiber light profile OP1 entering the GRIN lens.

Figure 10:
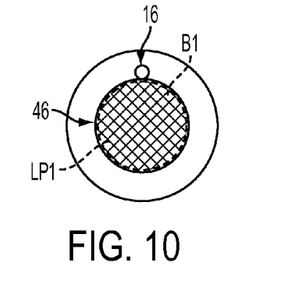
FIG. 10 depicts a sectional view taken substantially along line 10-10 of FIG. 1 wherein the first light beam is fully-expanded by the first GRIN lens.

This difference may be more fully-appreciated by referring to FIGS. 1 and 10, wherein the first light beam path B1 is fully-expanded by the first GRIN lens 18. More specifically, the first light profile illuminates that entire cross-sectional area of the GRIN lens 18 as the light emerges from an opposite or output end 24 thereof.

Figure 11:
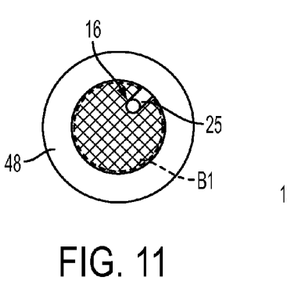
FIG. 11 depicts a sectional view taken substantially along line 11-11 of FIG. 1 wherein the first light beam remains fully-expanded and collimated by an non-refractive optical lens or spacer and a groove receives the second optical fiber to guide the end to the center of a second GRIN lens.

In FIGS. 1 and 11, the first light beam path B1 remains expanded and collimated within a first, non-refractive, optic element 46. Functionally, the first non-refractive optic element 46 is open space between the serially arranged first and second GRIN lens 18, 20 of the first fiber optic connector 10. Moreover, the optic element 46 functions as a cable end holder that provides the axial space necessary to guide the second fiber end 16E of the second optical fiber 16 into the second GRIN lens 20. More specifically, a groove 25 is molded, cut, machined or otherwise formed in the optic element 46 along its periphery. While, for illustration purposes, the groove 25 is shown as a spiral having an axis which coincident with the longitudinal axis LA of the first fiber optic connectors 10, it should be appreciated that the groove 25 may be a linear groove which slopes or is inclined to guide the second optical fiber end 16E to the geometric center of the second GRIN lens 20. A linear groove 25 has the advantage of minimizing the shadowing effect that the groove 25 may have on the light beam path B1 transmitted through the optical element 46.

Figure 12:
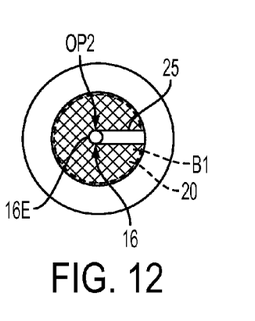
FIG. 12 depicts a sectional view taken substantially along line 12-12 of FIG. 1 wherein the second GRIN lens receives a second light beam from the second optical fiber the first light beam remains fully-expanded and collimated by a first non-refractive optical lens or spacer and a groove receives the second optical fiber to guide an end thereof to the center of a second GRIN lens.

In FIGS. 1 and 12, the groove 25 forms a horizontal channel to receive the second optical fiber 16 such that a second light beam emitted from the second fiber end 16E may be received by the second GRIN lens 20. The second light beam produces a second fiber light profile OP2 corresponding to the cross-sectional area of the second optical fiber 16. While the original fiber light profile OP2 produced by the second optical fiber 16 may be different than the original fiber light profile OP1 produced by the first optical fiber 14, in the described embodiment, the fiber light profiles OP1, OP2, are essentially equal, hence, OP2=OP1. Inasmuch as conventional fiber optic filaments which carry fiber optic signals are standardized, the fiber light profile produced by a single filament will essentially be equal, plus (+) or minus (−) some manufacturing tolerance.

Figure 13:
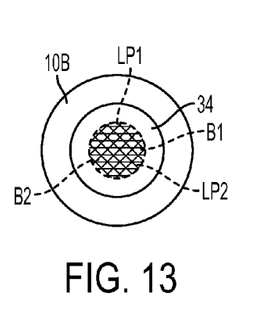
FIG. 13 depicts a sectional view taken substantially along line 13-13 of FIG. 1 depicting a mating interface between the first fiber optic cable connector and a second fiber optic cable connector wherein the light beams from the first and second fiber optic cables are transmitted into a second light management device of the second fiber optic cable connector.

In FIGS. 1, 12 and 13, the second GRIN lens 20 receives the second channel, signal or beam from the second fiber end 16E along a face surface 26 of the second GRIN lens 20. The second GRIN lens 20 modifies the second beam such that a second fiber beam path B2 is produced through the second GRIN lens 20. The second fiber beam path B2 results in a second fiber light profile LP2 which is different than the original fiber light profile OP2 emitted by the second optical fiber 16. Inasmuch as the original fiber light profiles OP1 and OP2 are essentially equal, the second fiber light profile LP2 will be different than the original fiber light emitted by the first optical fiber 14.

More specifically, the second GRIN lens 20 expands the second beam while at the same time causing the first beam to contract or collapse. Inasmuch as the second GRIN 20 lens is an "eighth" pitch lens (discussed in greater detail hereinafter), the second beam B2 will not be fully-expanded at the exit plane 28 of the lens 20. Similarly, the first beam, which was fully-expanded at the input plane 26 of the second GRIN lens 20, will not fully-contract the first beam at the output plane 28. Rather, the second beam will be expanded to only one-half its full radius dimension while, similarly, the first beam will be contracted by one-half the radius dimension at the exit plane 28. Accordingly, the path B1 will be contracting or collapsing as it exits the second GRIN lens 20 and the path B2 of the second beam will be expanding as it emerges from the second GRIN lens 20. The subsequent paragraphs provide a more throughout treatment of the light management system and the light paths produced by the GRIN lenses.

In FIG. 1, the second fiber optic cable connector 12 is optically coupled to the first fiber optic cable connector 10 such that the first and second light management devices of each may pass data between the first and second optical fiber cables OC1, OC2 without physically connecting the optical fibers of each of the optic cable connectors 10, 12.

Like the first fiber connector 10, the second fiber connector 12 includes third and fourth optical channels or fibers 30, 32. It should be understood that the first optical fiber 14 of the first fiber connector 10 corresponds to the third optical fiber 30 of the second fiber connector 12. And, the second optical fiber 16 of the first fiber connector 10 corresponds to the fourth optical fiber 32 of the second fiber connector 12. In other words, a beam of light that enters the first connector 10 through the first optical fiber 14 will exit through the third optical fiber 30 of the second connector 12 and vice versa. Likewise, a beam of light entering the first connector 10 through the second optical fiber 16 will exit the fourth optical fiber 32 of the second connector 12 and vice versa.

The second fiber optic cable connector 12 includes a body 12B extending along a longitudinal axis LA. The second connector 12 includes a second cable receiving end 12R configured to receive at least part of the second optical cable OC2. The body 12B of the second optic fiber connector 12 is configured to receive third and fourth optical fibers 30 and 32. The third optical fiber 30 has a third fiber end 30E positioned substantially on the longitudinal axis LA at a third axial position A3. The second optical fiber 32 has a second fiber end 32E positioned on the longitudinal axis LA at a fourth axial position A4. In the described embodiment, the third and fourth fiber ends 30E, 32E are positioned along the longitudinal axis LA such that the ends 30E, 32E are axial spaced-apart along the longitudinal axis LA. The third and fourth optical fibers 30, 32 have essentially the same diameter dimension as the first and second optical fibers 10, 12 and may also be referred to as filaments, channels, or lines, as each transmits data and/or information along a beam of light.

Similar to the first fiber optic connector 10, the second fiber optic connector 12 includes a second light management device comprising a third GRIN lens 34 associated with the third optical fiber 30 and a second GRIN lens 36 associated with the fourth optical fiber 32. The third and fourth GRIN lens 34, 36 are cylindrical/tubular in shape, coaxially aligned along the longitudinal axis LA and are spaced-apart by a distance X2.

Figure 14:
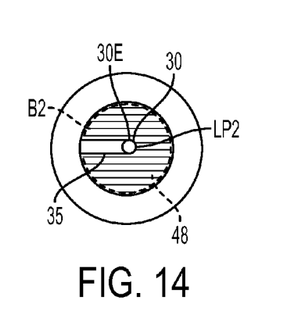
FIG. 14 depicts a sectional view taken substantially along line 14-14 of FIG. 1 wherein a third GRIN lens of the second light management device fully-contracts a first light beam path from the first optical fiber and fully-expands the second light beam path from the second optical fiber cable and wherein the first light beam produces a fiber light profile for being received by a third optical fiber of the second fiber optic cable connector.

In FIGS. 1 and 13, 14, the third GRIN lens 34 receives the contracted light beam from the first optical fiber 14. It will be recalled that the second GRIN lens 20 modified the light beam path B1 from the first optical fiber 14 by partially contracting the beam of light at the exit plane 28. The third GRIN lens 34, in turn, modifies the first light beam path B1 such that the first light beam is fully-contracted at the exit plane 38 of the third GRIN lens 34. Furthermore, the light beam path B1 is reduced to a point of light on the longitudinal axis LA, i.e., at the geometric center of the third GRIN lens 34, and corresponds to the original fiber light profile OP1 of a conventional fiber optic filament. As such, the beam of light carried by the first optical fiber 14 is modified by the third GRIN lens to the original fiber light profile OP1 which is receivable by the end 30E of the third optical fiber 30.

It will be also be recalled that the second GRIN lens 20 modified the light beam path B2 from the second optical fiber 16 by partially expanding the beam of light at the exit plane 28. In FIGS. 1 and 14, the third GRIN lens 34 modifies the light beam to fully-expand the light beam path B2. That is, the fully-expanded light beam produces a light beam profile LP2 (see FIG. 14) which fully-illuminates the cross-sectional area of the third GRIN lens 34 at its exit plane 38.

Figure 15:
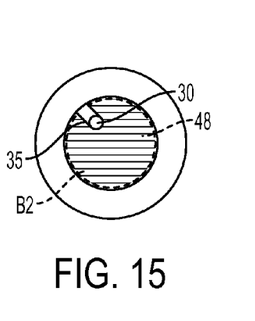
FIG. 15 depicts a sectional view taken substantially along line 15-15 of FIG. 1 wherein the fully-expanded light beam from the second optical fiber passes through a second non-refractive optical element and the third optical fiber is guided within a groove of the second non-refractive optical element.

In FIGS. 1 and 15, the third optical fiber 30 is guided within a groove 35 of a second, non-refractive, optical element 48 from the geometric center of the third GRIN lens 34 to the outer periphery of the fourth GRIN lens 36 for connection to the second optical cable OC2. More specifically, the second, non-refractive, optic element 48 provides sufficient open space between the third and fourth GRIN lens 30, 32, to allow displacement of the third optical fiber 30 from an axial position along the axis LA to a radial position off, or away from, the longitudinal axis LA. The groove 35 is molded, cut, machined or otherwise formed in the optic element 48 along its periphery and has an axis which coincident with the longitudinal axis LA of the fiber optic connector 12. While, for illustration purposes, the groove 35 is shown as a spiral, it should be appreciated that, similar to the first optical element 25, the groove 35 may be a linearly sloping as it guides the third optical fiber end 30E from the geometric center of the third GRIN lens 34.

It should be appreciated that, depending upon the embodiment, each of the optic elements 46 and 48 can be a non-optical object configured to hold and retain a cable end at a suitable radial position. Also, the optic elements 46 and 48 can be eliminated, and the bodies 10B and 12B can include interior surfaces configured to hold the cable ends at designated radial positions within the bodies 10B and 12B.

Figure 16:
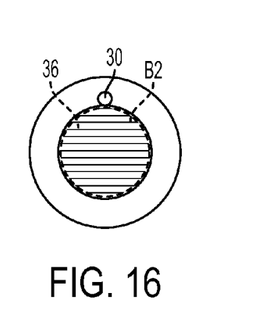
FIG. 16 depicts a sectional view taken substantially along line 16-16 of FIG. 1 wherein the fully-expanded light beam from the second optical fiber passes into a fourth GRIN lens and the third optical fiber is guided radially outboard of the fourth GRIN lens.

In FIGS. 1 and 16, the second, non-refractive, optical element 48 receives the fully-expanded beam of light from the second optical fiber 16 and directs the light beam path B2 toward the further GRIN lens 36. The non-refractive optical element 35 collimates the light beam from the entrance to the exit planes 38, 42 thereof while the third optical fiber 30 is guided into its desired input and output positions relative to the third and fourth GRIN lens 34, 36.

Figure 17:
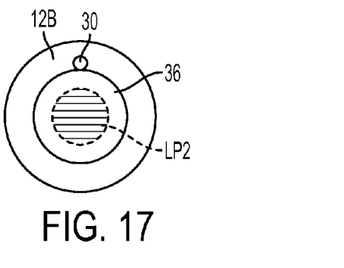
FIG. 17 depicts a sectional view taken substantially along line 17-17 of FIG. 1 wherein the fourth GRIN lens partially-contracts the second light beam and the third optical fiber of the second optical fiber connector is disposed radially outboard of the fourth GRIN lens.
Figure 18:
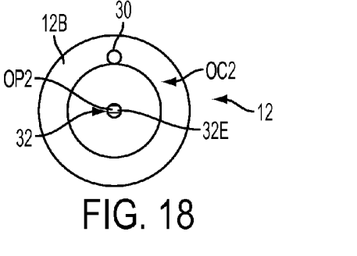
FIG. 18 depicts a sectional view taken substantially along line 18-18 of FIG. 1 wherein a fourth optical fiber receives the fully-contracted fiber light profile of second light beam along the longitudinal axis of the second optical fiber connector and the third optical fiber is radially outboard of the fourth fiber optical fiber.

In FIGS. 1, 17 and 18, the fourth GRIN lens 36 contracts the second beam of light from the second optical fiber 16. In FIG. 17, the second beam modifies the second light beam path B2 by partially contracting or collapsing the beam of light. In FIG. 18, the fourth GRIN lens 36 modifies the light beam path B2 to fully-contract the second beam light. That is, the fourth GRIN lens 36 produces a fiber light profile which enables the fourth optical fiber 32 to receive the light beam.

While the first and fourth GRIN lenses 18, 36 in the embodiment of FIG. 1, are quarter pitch lens that fully-expand or contract light along its length, the second and third GRIN lens 20, 34 are eighth pitch lens. Accordingly, light entering a center point through an input plane 26 on the left side of the second GRIN lens 20 is configured to partially expand, i.e., half-way, by the time that it emerges from an output plane 28 on the right side. Similarly, light entering the right side 28 from the second optical fiber connector 12 that is partially contracted may be configured to fully-contract to the center point on the left side 26 of the second GRIN lens 20. Hence, light may focus directly back into the second fiber channel 16.

It should be understood that, while the second GRIN lens 20 is an "eighth pitch" lens and the first GRIN lens 18 is a "quarter pitch" lens, the physical length of the first and second GRIN lenses may or may not actually have a ratio of 2:1 in order to achieve a 2:1 refraction ratio. Rather, the partial expansion of light provided by the second GRIN lens 20 is a function of both the length and the gradient of refraction. For example, a larger gradient of refraction of the second GRIN lens 20 relative to the first GRIN lens 18 may result in an embodiment where the second GRIN lens 20 is less than half the length of the first GRIN lens 18.

A description of the light beam path associated with each of the optical fibers 14, 16, 30, 32 will hereinafter be provided. Light enters the mated connectors 10, 12 via the first optical fiber 14 of a first optical fiber cable OC1. The light from the first optical fiber 14 enters the center of the first GRIN lens 18 along the input plane 22. The light begins as a fully-contracted beam of light, i.e., as the initial fiber light profile, and becomes a fully-expanded beam as it exits the output plane 24 of the first GRIN lens 18. The light continues past the open space 46 located between the first and second GRIN lenses 18, 20, remaining in the fully-expanded state. The beam of light then enters the second GRIN lens 20 of the first connector 10 in the fully-expanded state. The second GRIN lens partially contracts the beam of light and exits the GRIN lens 20 in a half-contracted state. The beam of light from the first optical fiber 14 immediately enters the third GRIN lens 34 of the second fiber connector 12. The third GRIN lens 34 continues to contract the beam of light until it is, once again, in a fully-contracted state. In its fully-contracted state, a fiber profile is produced which can be transmitted along conventional fiber optic channels or cables. The third optical fiber 30, therefore, conveys the light transmission into the second fiber optic cable OC2

Light entering the mated connectors 10, 12 via the second optical fiber 16 is input into the center of the second GRIN lens 20 along the input plane 26. The beam of light partially expands in the second GRIN lens 20 and exits the second GRIN lens 20 the output plane 28 in a half-expanded state. The light then immediately enters the third GRIN lens 34 of the second fiber connector 12 and continues to expand until it is in a fully-expanded state as the light emerges from the output plane 38 of the third GRIN lens 34. The beam of light then leaves the third GRIN lens 34 and travels past the open space 48 located between the third and fourth GRIN lenses 34, 36, remaining in the fully-expanded state. The beam of light then enters the fourth GRIN lens 36 in the fully-expanded state. The fourth GRIN lens 36 contracts the beam of light to produce the first light profile for transmission by the fourth optical fiber 32 within the second optical fiber cable OC2.

Light entering the mated connectors 10, 12 via the third and fourth optical fibers 30, 32 is managed in the same manner as described above in connection with the first and second optical fibers 14, 16, but in reverse. Consequently, the first and second light management devices, each comprising a pair of spaced GRIN lens, are configured so that, when a light beam is sent from an optical fiber in a sending or first direction, e.g., the first optical fiber 14, the first GRIN lens 18 of the first light management device expands the light beam, and when the first GRIN lens 18 of the first light management device receives a corresponding light beam from the corresponding optical fiber 30 in a second or receiving, the first GRIN lens 18 contracts the first light beam to a fiber profile OP1 receivable by the first optical fiber 14.

Underlying the teachings discussed above is a method for operatively coupling a plurality of optical fiber cables such that a light management device may transmit data between the first and second optical fiber cables OC1, OC2 without physically connecting the optical fibers 14, 16, 30, 32 of the optic cable connectors 10, 12. Furthermore, the method allows for optical fibers to be arranged about an axis without the requirement to key an optical fiber of one connector 10 with an optical fiber of another connector 12. The method comprises a first step of receiving a plurality of light beams from a plurality of cable ends 14E, 16E. The optical fibers 14, 16, 30, 32 may be associated with either one of the first or second optical fiber connectors 10, 12 since the light signals or data transmitted may be conveyed in either direction, i.e., in a sending or receiving direction. The ends 14E, 16E, 30E, 32E are positioned along, and about, a common longitudinal axis LA. In a next step, the light beams emitted by the ends 14E, 16E, 30E, 32E are changed or modified from a fiber light profile OP1, OP2 to a different light profile LP1, LP2. As mentioned above, the fiber light profile OP1, OP2 refers to the original fiber light profile corresponding to the area, normal to the longitudinal axis LA of a conventional fiber optic filament. Furthermore, the fiber light profile OP1, OP2 is changed by one of the GRIN lenses 18, 20, 34, 36 to a different light profile, e.g., a fully or partially expanded profile LP1, LP2. Finally, the light beam corresponding to the different light profile LP1, LP2 is returned or changed once again to its original fiber light profile OP1, OP2 or to another light profile which is receivable by one of the ends 14E, 16E, 30E, 32E of the optical fibers 14, 16, 30, 32.

Accordingly, it will be appreciated that the light associated with one of the light beams is: (i) transmitted at one axial location A1, A2, A3, A4 of one of the optical fiber connectors 10, 12, (ii) expanded by one of the GRIN lens 18, 20, 34, 36, (iii) transmitted over or around an end 14E, 16E, 30E, 32E of another one of the light beams (i.e., a light beam transmitting light at another axial location A1, A2, A3, A4) and (iv) received by an optical fiber 14, 16, 30, 32 of the other of the optical fiber connectors 10, 12.

In the embodiment shown in FIG. 1, the GRIN lenses 18, 20, 34, 36 may have a circular cross section. However, other embodiments may include, but are not limited to, oval-shaped, square, rectangular, triangular, polygonal cross sections, and other like cross-sectional shapes. Further, while the description hereinabove refers to the complete expansion and contraction of the light at the end points of the GRIN lenses 18, 20, 34, 36, the light beam need not achieve this configuration. For example, the beam of light may never achieve complete expansion of the entire cross section of a GRIN lens 18, 20, 34, 36, but may instead encompass a majority of the cross sectional area of a GRIN lens.

Located between the first and second GRIN lenses 18, 20 of the first connector 10 and the first and second GRIN lenses 34, 36 of the second connector 12 are open spaces 46 and 48. These open spaces 46, 48 facilitate the input of another channel along the longitudinal axis. It should be appreciated that these spaces 46, 48 may simply be open air allowing light to pass therebetween without refracting the light. In other embodiments, the open spaces 46, 48 may comprise a non-refractive lens which may be placed between the first and second In the described embodiment, the diameter dimension of the first, second third and fourth optical fibers 14, 16 may, for example, be approximately 3.5 μm to approximately 11 μm. Similarly, the diameter of each of the GRIN lenses 18, 20, 34, 36, may be approximately 1.8 mm. Thus, the fiber channels 14, 16, 30, 32 may be significantly smaller in area than the GRIN lenses 18, 20 allowing for relatively low loss by the fact that the second channel 16 and the first channel 30 is inserted into the surface area of light being transmitted between the first and second GRIN lenses 18, 20 and the third and fourth GRIN lenses 34, 36.

Figure 2:
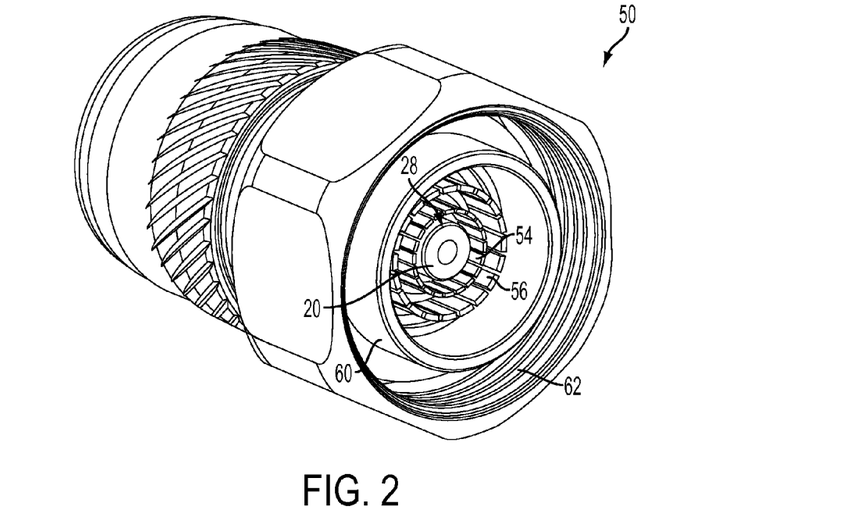
FIG. 2 depicts a perspective view of a first one of the optical fiber connectors which has been decoupled from the pair of fiber optical cable connectors shown in FIG. 1.
Figure 3:
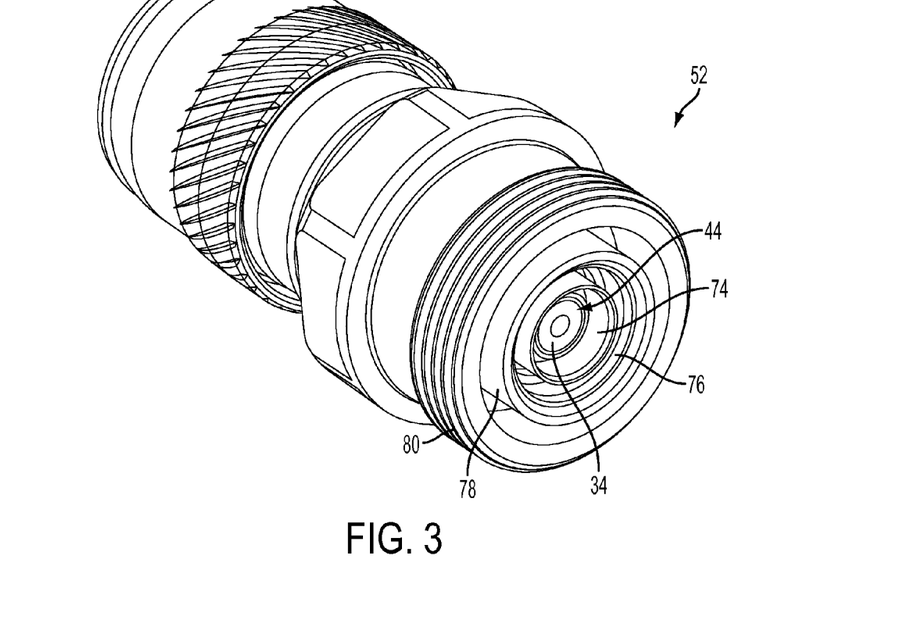
FIG. 3 depicts a perspective view of the second one of the optical fiber connectors shown in FIG. 1.

In FIGS. 2 and 3, a first hybrid optical fiber connector 50 is depicted including a first light management device having the same elements and configuration as the fiber optic cable connectors 10 described hereinbefore. When describing the light management device, the same reference numerals will be used to denote the same or similar elements. At the center of the mating interface is the right side 28 of the second GRIN lens 20 of the connector 50. A pair of concentric rings 54, 56 surround the optical light management device and is disposed between the light management device and an outer body 60 of the connector 50. The inner and outer concentric rings 54, 56 are operative to convey direct current (DC) when connected to a source of DC power and may be integrated or coupled with a pair of rings 74, 76 of a mating hybrid connector 52 shown in FIG. 3 below. Further, the connecting rings 54, 56, 74, 76 may transfer electrical data across the connector 50

The outer body 60 may be largely made from a ferrule material, however, other metallic materials, may be utilized such as iron, stainless steel, bronze, or the like. Furthermore, the outer body 60 may include a coupler, i.e., a hex-shaped nut, having female threads 62 for connecting to male threads 80 of the mating hybrid connector 52.

In FIG. 3, a second hybrid optical fiber connector 52 is depicted including a second light management device having the same elements and configuration as the fiber optic cable connector 12 described hereinbefore. When describing the light management device, the same reference numerals will be used to denote the same or similar elements. At the center of the mating interface is the right left side 44 of the third GRIN lens 34 of the connector 52. A pair of concentric rings 74, 76 surround the optical light management device and is disposed between the light management device and an outer body 78 of the connector 50. The inner and outer concentric rings 74, 76 are operative to convey direct current (DC) when connected to a source of DC power and may be integrated or coupled with the rings 54, 56 of the mating hybrid connector 50 shown in FIG. 2. Similar to the first hybrid connector of FIG. 2, the outer body 78 of the second hybrid connector may be largely made from a ferrule material, however, other metallic materials, may be utilized such as iron, stainless steel, bronze, or the like.

Figure 4:
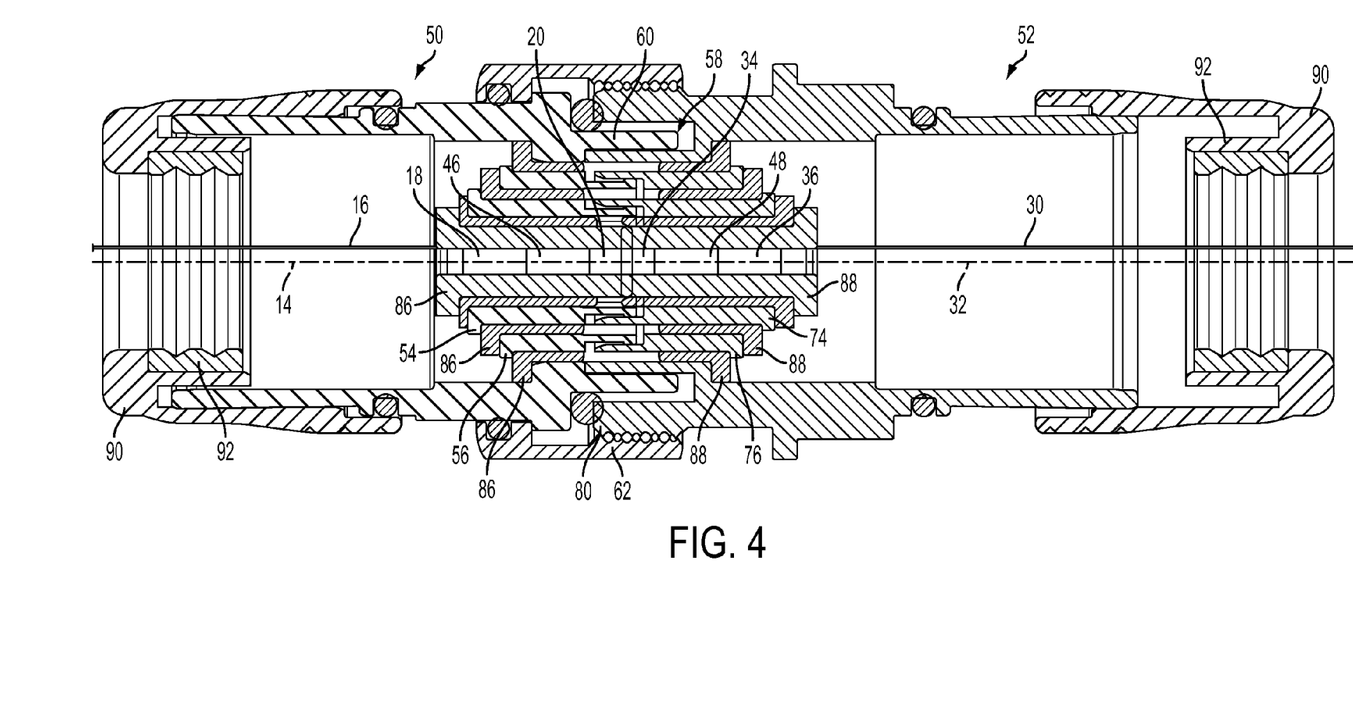
FIG. 4 depicts a cross sectional view of the mated pair of optical fiber connectors of FIG. 1.

In FIG. 4, a cross sectional side view of the mating hybrid optical connectors 50, 52 is shown. The first and second light management devices comprise the GRIN lenses 18, 20, 34, 36 and spacer elements 46, 48 such as those described in FIG. 1. Insulator elements 86, 88 are interposed between the rings 54, 56, 74, 76 of the connectors 50, 52. Each of the connectors 50, 52 further include fastening members 90 and seal 92 to help fasten and seal the connector 50, 52 to optical fiber cables (not shown).

In operation, the outer coupling member 60 of the first connector 50 may be inserted into the coupling channel 58 of the second connector 52 and rotated until the rings 54, 74, 56, 76 contact and the left side 44 of the first GRIN lens 34 of the second connector 12 and the right side 28 of the second GRIN lens 28 of the first connector 10 make contact along the mating interface 11. In the described embodiment, at least one of the light management devices is initially protruding and spring-biased toward the other of the light management devices. When mated, the spring biased light management device is contacted by the other light management device and urged back into the respective connector body 60, 78.

It should be appreciated that the outer coupling member 80 of the second connector 52 may be configured to rotate about the rest of the connector 12 in one embodiment in order to connect the two connectors 50, 52. While FIGS. 2-4 show embodiments of one type of hybrid optical connector, it should be understood that the configuration of GRIN lenses, spacers, and fiber channels described herein may be applicable to any type of multi-channel fiber connector.

Figure 5:
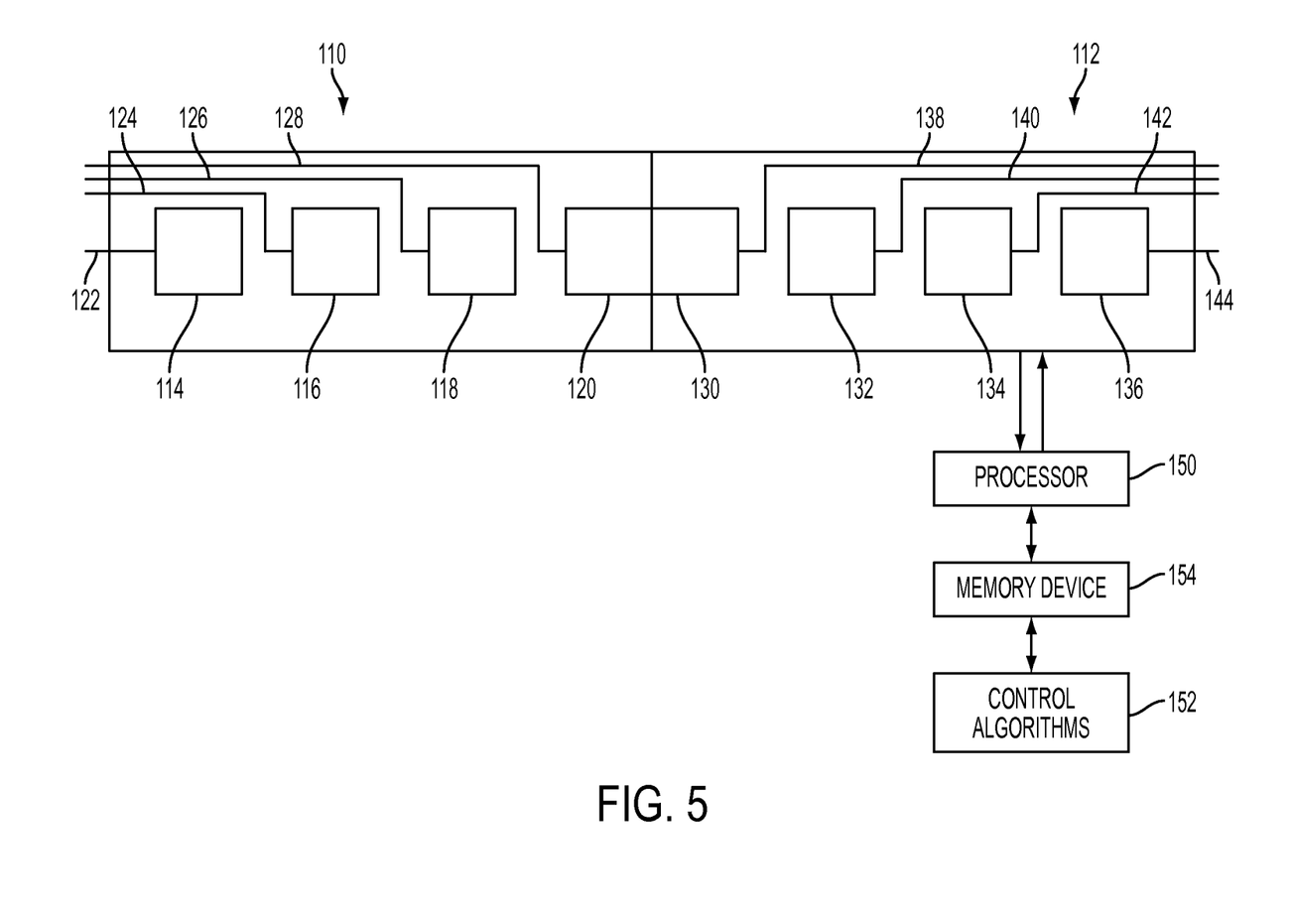
FIG. 5 depicts a schematic view of another embodiment including a mated pair of four-channel connectors.

The principles described herein may be applicable to a connector having any number of optical fibers. Referring now to FIG. 5, another schematic view is shown of a mated pair of four optical fiber connectors 110, 112. A first connector 110 may include first light management device comprising a first GRIN lens 114, a second GRIN lens 116, a third GRIN lens 118, and a fourth GRIN lens 120. The GRIN lenses 114, 116, 118, 120 may be spaced apart similar to the embodiment described hereinabove with respect to FIG. 1. The first optical fiber connector 110 further includes a first optical channel or fiber 122, a second optical channel or fiber 124, a third optical channel or fiber 126, and a fourth optical channel or fiber 128. The first optical fiber 122 may be input into the center of the first GRIN connector 114. The second optical fiber 124 may be inserted between the first GRIN connector 114 and the second GRIN connector 116 and be input into the left side of the second GRIN connector 116. The third optical fiber 126 may be inserted between the second GRIN connector 116 and the third GRIN connector 118 and be input into the left side of the third GRIN connector 118. Finally, the fourth optical fiber 128 may be inserted between the third GRIN connector 118 and the fourth GRIN connector 120 and be input into the left side of the fourth GRIN connector 120.

A second connector 112 may include a first GRIN lens 130, a second GRIN lens 132, a third GRIN lens 134, and a fourth GRIN lens 136. The GRIN lenses 130, 132, 134, 136 may also be spaced apart similar to the embodiment described hereinabove with respect to FIG. 1. The second connector 112 may include a second light management device comprising a first optical fiber 138, a second optical fiber 140, a third optical fiber 142, and a fourth optical fiber 144. These first, second, third, and fourth channels 138, 140, 142, 144 of the second connector 112 correspond to the respective first, second, third, and fourth channels or optical fibers 124, 126, 128, 130 of the first connector 110. The fourth optical fiber 144 may be input into the center of the fourth GRIN connector 136. The third optical fiber 142 may be inserted between the forth GRIN connector 136 and the third GRIN connector 134 and be input into the right side of the third GRIN connector 134. The second optical fiber 140 may be inserted between the third GRIN connector 134 and the second GRIN connector 132 and be input into the right side of the second GRIN connector 132. Finally, the first optical fiber 138 may be inserted between the second GRIN connector 132 and the first GRIN connector 130 and be input into the right side of the first GRIN connector 130.

In this embodiment, the first, second and third GRIN lenses 114, 116, 118 of the first connector 110 and the second, third and fourth GRIN lenses 132, 134, 136 of the second connector 112 may each be eighth pitch GRIN lenses that are configured to expand or contract light half way by the time it exits the respective GRIN lens. The fourth GRIN lens 120 of the first connector 110 and the first GRIN lens 130 of the second connector 112 may each be sixteenth pitch GRIN lenses.

Thus, light entering the mated connectors 110, 112 from the first channel 122 becomes fully-expanded when it exits the right side of the second GRIN lens 116. The third GRIN lens 118 begins to contract the light. The light enters the fourth GRIN lens 120 of the first connector 110 in a half way contracted state. The light continues to contract three quarters of the way as it exits the connector 110 and becomes fully-contracted to a single beam as it exits the first GRIN lens 130 of the second connector 112. Thus, the light exits out the first channel 138 of the first GRIN lens 130.

The second optical fiber 124 similarly inputs light into the second GRIN connector 116. This light expands and then contracts as it passes through the mated connectors 110, 112 until it exits the second GRIN lens 132 of the second connector 112 out the second optical fiber 140. The third optical fiber 126 inputs light into the third GRIN connector 118. This light expands and then contracts as it passes through the mated connectors 110, 112 until it exits the third GRIN lens 134 of the second connector 112 out the third optical fiber 142. Finally, the fourth optical fiber 128 inputs light into the fourth GRIN connector 120. This light expands and then contracts as it passes through the mated connectors 110, 112 until it exits the fourth GRIN lens 136 of the second connector 112 out the fourth optical fiber 144.

Thus, coaxially arranged GRIN lenses and optical fibers described herein may be applied with any number of channels, depending on the amount of refraction present and the length of each GRIN lens. The less refraction occurring in each spaced GRIN lens, the more channels the connector may be able to accommodate. Furthermore, in one embodiment, the channels may each be inserted at the exact same location in the cross sectional area between the lenses. For example, each of the optical fibers may be extend from the top most location of the GRIN lens directly into the center. With each of the optical fibers aligned in this way, the light signal degradation may be minimized. In other embodiments, the optical fibers may extend from different locations around the circumference of the channel. For example, one fiber may extend from a topmost location of the circumference. Another may extend from a rightmost location. Another may extend from a leftmost location.

In some embodiments the spacing of the GRIN lenses apart may be equal. In other embodiments, the spacing may be different. Whatever the embodiment, the GRIN lenses may be spaced coaxially, and the connector channels may be input into the GRIN lenses at coaxial locations.

In some embodiments, the first and second light management devices may comprise an electrical component operative to control the light input into each of the optical fibers. More specifically, the electronic light management device may include a power source, one or more lens movers, a processor 150 operative to execute control logic or algorithms 152, and a data storage device 154 operative to store threshold data or information for augmenting the decision making control logic 152. The data storage device or memory device 154, which include a suitable circuit, stores the logic 152. In operation, the lens movers, which may be motorized or otherwise magnetically controlled, are operable to control the movement of the GRIN lenses.

Figure 6:
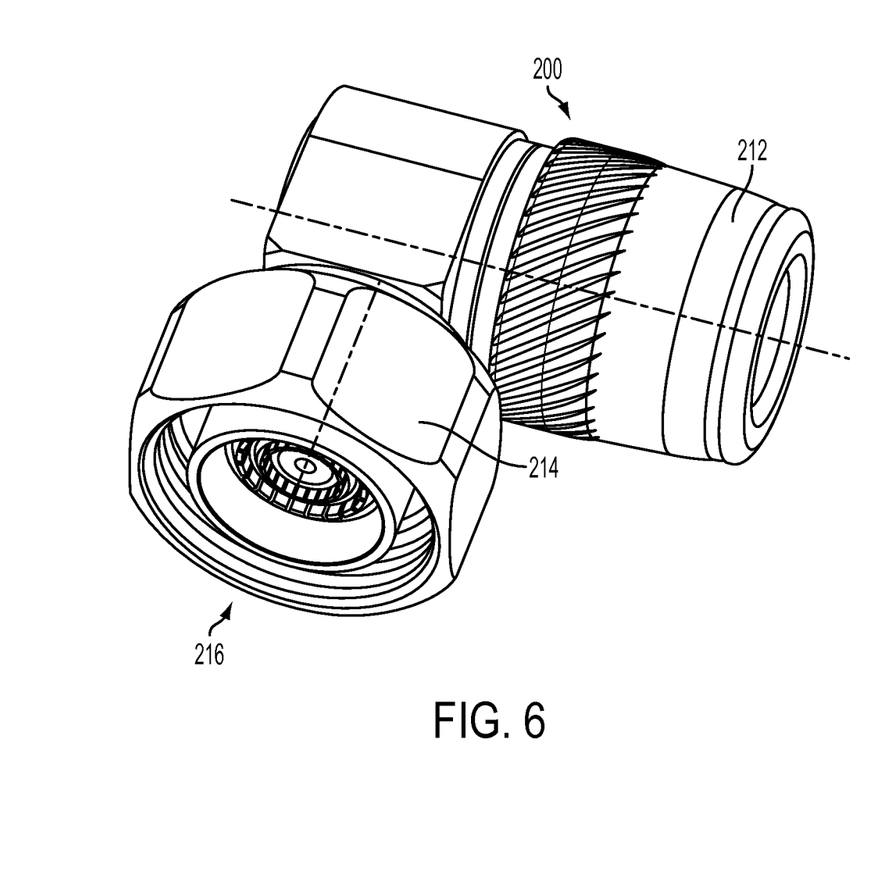
FIG. 6 depicts a perspective view of another embodiment including a two channel right-angle connector.
Figure 7:
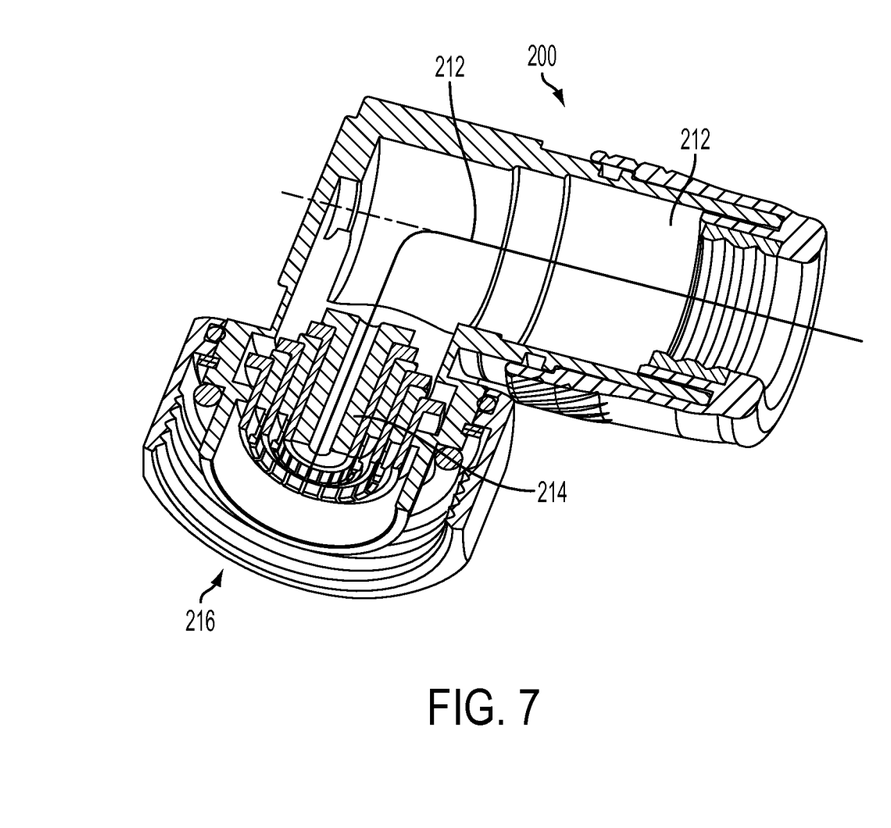
FIG. 7 depicts a perspective cutaway view of the two channel right angle connector of FIG. 6.

According to another embodiment, a right angle connector is shown 200 in FIGS. 6-7. This connector 200 is similar to the connectors 10, 12 inasmuch as they may include two input optical fibers 14, 16, or 30, 32. The right angle connector 200 includes a base portion 212 from which protrudes a GRIN lens portion 214 which extends from the base portion 212 at a right angle. The base portion 212 houses the two optical fibers channels 214, which may bend or curve around the right angle within the connector. After bending 90 degrees within the connector 200, the two fiber channels may approach a GRIN lens arrangement 214. The GRIN lens arrangement may be similar to the arrangement shown in FIG. 1 having two GRIN lenses arranged coaxially along a length of the connector 212. The connector 212 further includes a mating end 216 for mating with an accompanying GRIN connector (not shown). While this embodiment shows that fiber may be bent within the connector in order to achieve a right angle connector that does not require keying, other, embodiments may include a mirror to bend the light for achieving a right angle turn within a connector.

It should be understood that the mechanical aspects of the connectors 10, 12, 50, 52, 110, 112, and 200 shown in the Figs. are not meant to be limiting. The coaxial GRIN lenses arranged along a length of an axis as described herein may be applied to other types of connectors not shown. For example, rotary joints or connectors may utilize the concepts described herein. Other non-connector embodiments are also contemplated that direct light through channels into and out of coaxially aligned GRIN lenses as described herein.

Additional embodiments include any one of the embodiments described above, where one or more of its components, functionalities or structures is interchanged with, replaced by or augmented by one or more of the components, functionalities or structures of a different embodiment described above.

It should be understood that various changes and modifications to the embodiments described herein will be apparent to those skilled in the art. Such changes and modifications can be made without departing from the spirit and scope of the present disclosure and without diminishing its intended advantages. It is therefore intended that such changes and modifications be covered by the appended claims.

Although several embodiments of the disclosure have been disclosed in the foregoing specification, it is understood by those skilled in the art that many modifications and other embodiments of the disclosure will come to mind to which the disclosure pertains, having the benefit of the teaching presented in the foregoing description and associated drawings. It is thus understood that the disclosure is not limited to the specific embodiments disclosed herein above, and that many modifications and other embodiments are intended to be included within the scope of the appended claims. Moreover, although specific terms are employed herein, as well as in the claims which follow, they are used only in a generic and descriptive sense, and not for the purposes of limiting the present disclosure, nor the claims which follow.

The following is claimed:

1. An optical fiber connector comprising:
   a body extending along an axis, the body configured to receive a plurality of optical fibers, the ends of each fiber being axially spaced apart from each other; and
   a light and data management device supported by the body and comprising:
   a first gradient refractive index (GRIN) lens to: (i) receive a first light beam from one of the optical fibers; (ii) modify the first light beam to produce a substantially circular first light beam profile; and (iii) radially expand or contract the first light beam so as to be receivable by another optical fiber connector;

a second gradient refractive index (GRIN) lens to: (i) receive a second light beam from one of the optical fibers; (ii) modify the second light beam to produce a second light beam profile; and (iii) radially expand or contract the second light beam so as to be receivable by the other optical fiber connector; and a pair of conductive concentric rings coaxially aligned with the GRIN lens; the GRIN lens transferring multiple channels of optical data to the other of the fiber optic connectors and the conductive concentric rings electrically transmitting data and power to a pair of corresponding concentric rings on another fiber optic connector.

2. The optical fiber connector of claim 1, wherein the light management device comprises a plurality of optical lenses spaced apart from each other along the axis, a first one of the optical lenses configured to produce the first light beam profile, a second one of the optical lenses configured to produce the second light beam profile which is different from the first light beam profile.

3. The optical fiber connector of claim 1, wherein the light management device is configured so that, when the first light beam is sent from the first optical fiber in a sending direction, the light management device expands the first light beam, and when the light management device receives a first corresponding light beam from the first corresponding optical fiber in a receiving direction, the light management device contracts the first light beam to a fiber profile receivable by the first optical fiber.

4. The optical fiber connector of claim 1, wherein the light management device comprises an electrical component selected from the group consisting of a circuit, a processor configured to execute logic, a memory device configured to store logic, and a combination of a processor operatively coupled to a memory device.

5. The optical fiber connector of claim 1 wherein the light management device includes a non-refractive optical element between two serially arranged gradient refractive index lenses.

6. The optical fiber connector of claim 1 further comprising a groove for guiding the end of one of the optical fibers from a radially outboard location to the geometric center of the optical fiber connector along the longitudinal axis of the optical fiber connector.

7. An optical fiber connector comprising:
a body;
a first lens supported within the body and receiving a first beam of light emitted from an end of a first optic fiber, the first lens emitting an expanded beam of light, and
a second lens supported within the body and receiving a second beam of light emitted from an end of the second optic fiber, the first and second lenses arranged along a longitudinal axis such that the second lens receives the light emitted from the first lens,
a pair of concentric rings disposed about the first and second lens and between the body and the first and second lens, the pair of concentric rings configured to be connected to a pair of concentric rings of another optical cable connector;
the expanded light emitted by the first lens travelling around the end of the second optic fiber and being substantially coaxial to the light emitted by the second optic fiber, the coaxially aligned beams of light providing rotational symmetry for data transfer about the longitudinal axis.

8. The optical fiber connector of claim 7 wherein at least one of the lenses is a gradient refractive index lens.

9. The optical fiber connector of claim 7 wherein the first and second lens are gradient refractive index lenses, the first gradient refractive index lens operative to expand light entering the lens and the second gradient refractive index lens operative to contract the light entering the lens.

10. The optical fiber connector of claim 7 wherein the second gradient refractive index lens is operative to expand and contract light entering the lens.

11. The optical fiber connector of claim 7 wherein the first and second lens are gradient refractive index lens and further comprising a non-refractive optical element disposed between the first and second gradient refractive index lenses.

12. The optical fiber connector of claim 7 wherein the first optic fiber is disposed along the longitudinal axis and the second optic fiber is disposed radially outboard of the longitudinal axis.

13. The optical fiber connector of claim 11 wherein the non-refractive optical element guides the end of one of the optical fibers from a radially outboard location to the geometric center of the second gradient refractive index lens.

14. An optical fiber connector comprising:
a first fiber channel;
a second fiber channel;
a first gradient refractive index lens; and
a second gradient refractive index lens;
a pair of concentric rings coaxially aligned with the first and second gradient refractive index lenses and between a body and the first and second gradient refractive index lenses
wherein the first fiber channel inputs a first beam of light into the first gradient refractive index lens;
wherein the second fiber channel inputs a second beam of light into the second gradient refractive index lens;
wherein the first and second gradient refractive index lenses are arranged coaxially such that the second fiber channel extends between the first gradient refractive index lens and the second gradient refractive index lens.

15. A hybrid multi-channel fiber optic connector comprising:
at least two data cables, a first data cable carrying fiber optic data including at least two fiber optic cables each producing an annular light profile to carry fiber optic data and a second cable including at least one data cable and one power cable;
a connector body receiving:
at least two gradient index refraction (GRIN) lenses axially spaced and mounted within the connector body and, one of the at least two fiber optic cables connecting to one of the GRIN lenses and the other of the at least two fiber optic cables connecting to the other of the GRIN lenses, the GRIN lenses configured to effect radial contraction and expansion of a light profile such that each light profile is distinct either in the direction of data travel or in the radial diameter of the light profile; and
at least one pair of conductive concentric rings coaxially aligned with the GRIN lenses and mounted within the connector body, the rings dedicated to either the transfer of data or power.

* * * * *